April 24, 1956     J. M. KELLY, JR     2,743,416

MAGNETIC FIELD MEASURING DEVICE

Filed March 12, 1952

INVENTOR.
JOSEPH M. KELLY, JR.
BY
Roland A. Anderson
ATTORNEY

United States Patent Office 2,743,416
Patented Apr. 24, 1956

2,743,416

MAGNETIC FIELD MEASURING DEVICE

Joseph M. Kelly, Jr., Seattle, Wash., assignor to the United States of America as represented by the United States Atomic Energy Commission Application March 12, 1952, Serial No. 276,215

5 Claims. (Cl. 324—43)

The present invention relates to an apparatus for measuring the intensity of an unknown magnetic field. Apparatus embodying the present invention can measure either static or dynamic magnetic fields at any desired point of measurement.

An intense magnetic field is an essential element of many devices such as mass spectrometers and high energy particle accelerators. In apparatus such as mass spectrometers, a uniform, static magnetic field is used and it is necessary to measure this field to a high degree of accuracy. In particle accelerators such as the proton synchrotron, it is necessary to have a dynamic magnetic field uniformly varying in accordance with the accelerated proton beam. In such a case, it is necessary to know when the magnetic field has reached a particular value at a certain point of the proton orbit. This information can also be used to synchronize the operation of component parts of the synchrotron with the variation of the synchrotron magnetic field.

For this purpose, apparatus incorporating the present invention can be fabricated to provide a voltage pulse when the dynamic magnetic field has reached the desired value. Conventional magnetic field measuring instruments use rotating or moving parts within the magnetic field and have a tendency to distort the field being measured. On the other hand, the present instrument measures the actual magnetic field at the point of measurement while using no moving parts during the time of measurement.

More particularly, the apparatus includes a magnetic core which is disposed along the lines of force of the unknown magnetic field at the point of measurement, the core having a very high permeability at zero magnetic field and a low permeability at all other values, a search coil wound about said core in the unknown magnetic field, means for establishing a standard magnetic field about said core, the lines of force of the standard field being of opposite polarity to the lines of force of said unknown field, means for varying said standard field whereby a voltage pulse is induced in the search coil when the resultant magnetic field about said core equals zero and means for measuring said standard magnetic field.

The many objects and advantages of the present invention may best be appreciated by reference to the accompanying drawings, the figures of which illustrate apparatus incorporating a preferred embodiment of the present invention and capable of carrying out the method of the invention. In the drawings.

Figure 1:
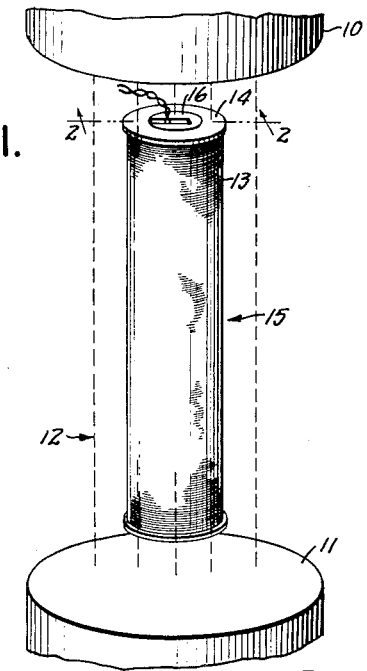
Figure 1 is a perspective view of the apparatus showing its position relative to the magnetic field under measurement.
Figure 2:
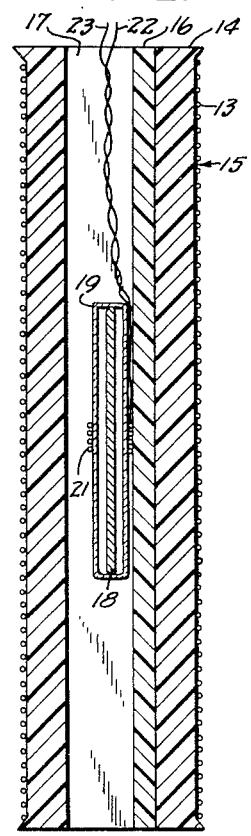
Figure 2 is a transverse sectional view of the apparatus taken along the lines 2—2.

Referring now to Figures 1 and 2, the apparatus is shown mounted between the poles 10 and 11 of the unknown magnetic field to be measured. The lines of force of this field, indicated generally by the arrow 12, are directed between the poles in a perpendicular relation thereto. The external part of the apparatus consists of a solenoid, indicated by the arrow 15, which includes a coil 13 uniformly wound about a non-magnetic form 14. Mounted axially of the form 14 is a rod 16 made of non-magnetic material such as phenol fiber and containing a channel 17. Mounted interiorly of the channel 17 near the center of the longitudinal axis of the solenoid 15 is a cylindrical magnetic core 18. Surrounding the core 18 is a tube 19 made of a non-magnetic material such as quartz. The tube 19 may easily be positioned within the channel 17 by use of rubber cement or other suitable means. Wound about the tube 19 is a search coil 21, a few turns of which are shown although actually the search coil 21 may consist of as many as two thousand turns of very thin enameled wire. A twisted pair of conductors 22 and 23 are connected to the search coil 21 and emerge from the apparatus through channel 17. Similarly, suitable connections, not shown, can be made to the externally wound coil 13.

The magnetic core 18 is made of ferromagnetic material such as molybdenum-Permalloy. This ferromagnetic core has a very high permeability, in the order of seventy-five thousand to one hundred thousand, when in a magnetic field of zero intensity but its permeability is greatly decreased when the magnetic field is increased. This characteristic results from the use of a very thin core 18, so that the core material is quickly saturated as the magnetic field is increased. After saturation, the permeability of the core decreases to a value comparable to the permeability of air which equals one. When a search coil such as coil 21 consisting of N turns of wire is wound around the core and the assembly placed in a uniform magnetic field which is increasing linearly with time, the voltage output of the search coil is determined from the following well known equation:

$$e = \frac{Nd\Phi}{dt} \times 19^{-8} = NA\frac{d(\mu H)}{dt} \times 10^{-8} \quad \text{Equation 1}$$

where A equals the cross sectional area of the core 18; $\mu$ equals the effective permeability which is a function of H and in turn a function of time; H equals the magnetic field in which the strip is placed which is also a function of time.

Figure 3:
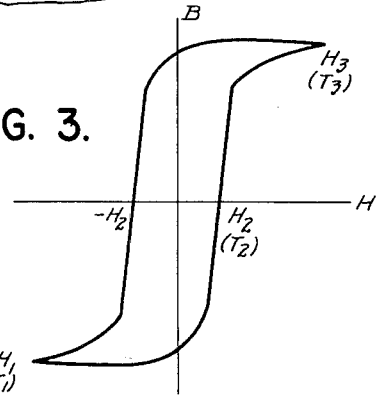
Figure 3 is a graph showing the desired magnetic characteristics of the core used in the apparatus.
Figure 4:
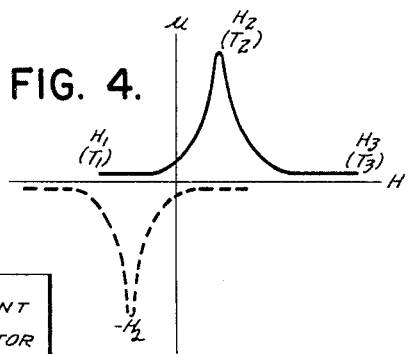
Figure 4 is a graphical representation of the variation of the permeability of the magnetic core used in the apparatus with the magnetic field.

Referring now to Figures 3 and 4, the variation of the core's permeability with respect to the flux density of the magnetic field being measured and the intensity of the field is represetned. In Figure 3, the ordinate B represents the flux density of the magnetic field and the abscissa H represents the magnetic field intensity. The relationship between the flux density, permeability and magnetic field intensity is well known to be: $B=\mu H$. Therefore, at some time $T_1$ and magnetic field value $H_1$, the core 18 is saturated and $\mu$, the permeability, is very low. At some time $T_2$ and field $H_2$, $\mu$ reaches its peak value while at time $T_3$ and field $H_3$, the core 18 is again saturated. The field $-H_2$ in Figures 3 and 4 is obtained if the magnetic field H is now decreased at the same rate.

In Figure 4, the variation of the permeablity $\mu$ is shown with respect to a linear time variation of magnetic field H. It can be seen that $\mu$ has a peak value only at field $H_2$. From Equation 1, it is apparent that the output voltage, e, of the search coil varies directly with the variation of $\mu$, since in a linearly varying magnetic field $dH/dt$ is a constant. Accordingly, the voltage output of the search coil 21 varies as shown in Figure 4 and gives an appreciable output voltage only at field $H_2$. This value of magnetic field $H_2$ is ideally zero but the graphs of Figures 3 and 4 are magnified to show the variation of permeability in an actual core.

Figure 5:
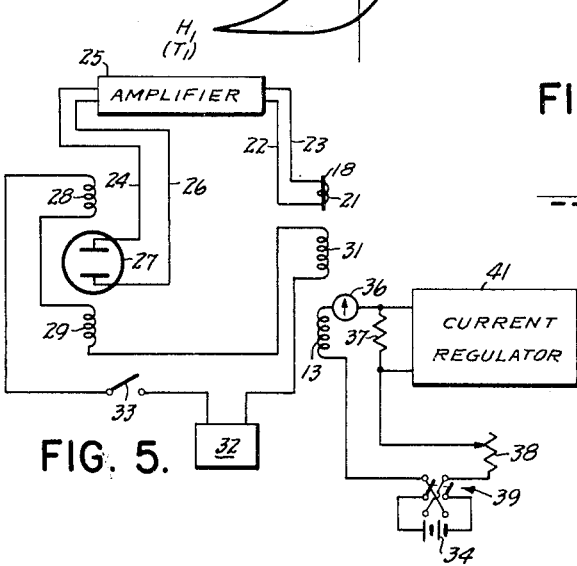
Figure 5 is a schematic representation of a measuring circuit used with apparatus incorporating the present invention for measuring static magnetic fields.

To use the apparatus with a static magnetic field, such as used in a mass spectrometer, the measuring circuit shown in Figure 5 can conveniently be used. The output conductors 22 and 23 of the search coil 21 are connected to a conventional amplifier 25 and the amplified output thereof connected on conductors 24 and 26 to the vertical deflecting plates of an oscilloscope 27. Connected to the horizontal focusing coils 28 and 29 of oscilloscope 27 is an alternating-current sweep coil 31. The sweep coil 31 is connected to an alternating-current energizing source 32 through switch 33. Energizing source 32 may be any conventional low frequency source for providing sinusoidal current and the standard 60 cycles per second power line may conveniently be used. The winding 13 of the solenoid shown in Figure 2 is connected to a direct current source 34 through ammeter 36, a resistor 37, a variable resistor 38 and a switch 39. Across resistor 37 is connected a conventional current regulator 41.

The sweep coil 31 may be constructed on a non-magnetic form in a manner similar to the solenoid 15 of Figure 1 except that its inner diameter should be large enough to enclose the solenoid 15. The uniformly wound sweep coil 31 is placed over the solenoid 15 and the entire assembled apparatus is placed in the static magnetic field at the desired point of measurement with the magnetic core 18 aligned along the lines of force of the magnetic field as illustrated in Figure 1. Switch 33 is closed and the sweep coil 31 is energized by the 60 cycle alternating current source 32. This provides a uniform dynamic magnetic field about the core 18.

Switch 39 is closed to energize the winding 13 and provide a uniform static field about the core 18. The direction of current flow through coil 13 may be reversed by means of switch 39 and should be chosen to produce lines of force about the magnetic core 18 of opposite polarity to the lines of force of the magnetic field. The field produced by coil 13 may conveniently be called a back bias field.

The current flowing through coil 13 may be increased or decreased by means of variable resistor 38 to respectively increase or decrease the magnetic field in the solenoid. When the standard static magnetic field is equal and opposite to the unknown static magnetic field, the permeability of the core 18 will be a maximum as described hereinabove. Since the dynamic magnetic field introduced by the coil 31 both increases and decreases the resultant magnetic field about the search coil 21, the maximum output pulse will be induced in the search coil 21 when the total of the three magnetic fields equals zero. That is, when the vector sum of $H_x$, the unknown magnetic field; $H_s$, the standard magnetic field introduced by the solenoid 15; and the dynamic magnetic field, $H_d$, equals zero. Since the dynamic magnetic field $H_d$ is synchronously applied to the horizontal sweep coils of the oscilloscope 27, the positive and negative peaks produced in the search coil 21 will be symmetrically displaced about the zero central position of the oscilloscope screen when the standard magnetic field $H_s$ is exactly equal to the unknown magnetic field $H_x$. These pulses are displayed on the oscilloscope screen as indicated in Figure 4.

If the field $H_s$ is higher or lower than the unknown field $H_x$, the voltage pulses displayed on the oscilloscope screen will be displaced from the zero central position.

Therefore, to operate the device, the assembled apparatus is placed at the point of measurement as described above and the adjustable resistor 38 is varied until the voltage pulses on the oscilloscope are symmetrically displaced about the central zero position. The current flowing through the coil 13 is then determined from the ammeter 36 which in turn determines the magnetic field introduced by the solenoid 15. Since the diameter of the solenoid 15 is known as well as the number of turns of the coil 13, the magnetic field introduced by the long solenoid 15 may be determined from the well known equation, $H = 0.4$ $NI$, where H is the magnetic intensity; N is the number of turns of coil 13 per centimeter length and I is the current in the coil in amperes.

If it is desired to calibrate the static magnetic field introduced by the solenoid 15, this may be accomplished by any of the conventional methods such as the use of the standard Helmholz coils. For most accurate measurement, the length of the solenoid 15 and the solenoid including coil 31 should be large compared to the solenoid diameter and to the length of the magnetic core 18. This insures uniform fields about the entire length of the core 18. This is easily accomplished as one satisfactory embodiment used a magnetic wire core 18 of molybdenum-Permalloy two inches long and two mils in diameter.

If it is desired to measure a dynamic magnetic field such as the one used with the proton synchrotron, it is not necessary to use the coil 31. For this measurement, the apparatus as shown in Figure 1 is inserted in the dynamic magnetic field at the point of measurement with the magnetic core 18 aligned along the lines of force of the magnetic field. In a dynamic magnetic field it is usually desired to know at what instant after the start of the field a certain point in the field reaches a particular intensity. For this purpose, the apparatus embodying the present invention is inserted at the specified point and a field, $H_s$, equal to the desired field, is introduced by the coil 13 by adjusting the current therethrough. The dynamic magnetic field is then started, usually by means of a voltage pulse. When the field $H_x$ at the desired point of measurement equals $H_s$, a voltage pulse will be induced in the search coil 21. Therefore, the time it takes to build up the magnetic field to the desired value $H_s$ at the desired point may easily be determined by measuring the elapsed time between the two pulses. This can be accomplished by use of a conventional counter chronograph, wherein the first pulse starting the magnetic field starts the counter chronograph and the second pulse, induced in the search coil 21, stops the counter chronograph. One instrument that can be satisfactorily used is the counter chronograph described in the U. S. Patent No. 2,575,759, W. A. Higinbotham.

With the proton synchrotron the apparatus embodying the present invention may provide still another function although still following the principles described herein. With the synchrotron it is often necessary to time the operation of component parts with the value of the magnetic field at particular points about the proton orbit. This can be accomplished with the subject apparatus by placing the apparatus at the desired point and introducing a standard back bias field $H_s$ as described above. When the dynamic magnetic field equals the back bias field $H_s$, a voltage pulse is induced in the search coil 21 and this voltage pulse may be used for starting the operation of component equipment such as injection or ejection apparatus. The use of the current regulator 41 insures a steady standard back bias field $H_s$ by continuously maintaining the current through the solenoid 15 at the constant desired level. One embodiment was constructed with a two inch length of molybdenum-Permalloy wire sealed inside a quartz tube of the same length with an inner diameter of 0.01 inch and an outer diameter of 0.05 inch. This embodiment operated in magnetic fields up to several hundred gauss with an accuracy of approximately ±0.02 gauss. By using water-cooled solenoids, the range can be extended up to the kilogauss region.

To insure the maximum permeability of the magnetic core, it is important that this core should not be deformed in any manner after annealing. This can be accomplished by sealing off one end of the quartz tube with the magnetic core in it, then annealing the core in an atmosphere of hydrogen and finally sealing off both ends of the quartz tube after it has cooled.

It should be noted that there are no moving parts in the apparatus embodying the present invention and therefore measurement of the actual magnetic field may efficiently be accomplished.

While the salient features of this invention have been described in detail with respect to one embodiment, it will, of course, be apparent that numerous modifications may be made within the spirit and scope of this invention and it is therefore not desired to limit the invention to the exact details shown except in so far as they may be defined in the following claims.

I claim:

1. An apparatus for measuring the intensity of an unknown magnetic field which comprises in combination a magnetic core disposed along the lines of force of said unknown field, said core having a permeability of at least 75,000 at zero magnetic field and a permeability of the order of one at other magnetic field values, a search coil wound about said core in the unknown field, means for establishing a uniform back bias magnetic field about said core, means for varying the intensity of said back bias field whereby a voltage pulse is induced in said search coil when the resultant magnetic field about said core equals zero and means for measuring the intensity of said back bias field.

2. Apparatus for measuring the intensity of an unknown static magnetic field which comprises in combination a magnetic core disposed along the lines of force of said unknown field, said core having a permeability of at least of the order of 75,000 at zero magnetic field and a low permeability of the order of one at other values, a search coil wound about said core in the unknown field, means for establishing a uniform back bias magnetic field about said core, means for varying the intensity of said back bias field, means for establishing a dynamic magnetic field about said core whereby a voltage pulse is induced in said search coil when the resultant magnetic field about said core equals zero, means for amplifying said voltage pulse and means for viewing the induced voltage pulse.

3. Apparatus for measuring the intensity of an unknown dynamic magnetic field which comprises in combination a uniformly wound solenoid having its longitudinal axis disposed along the lines of force of said unknown field, the length of said solenoid being large with respect to its diameter, a ferromagnetic core sealed within a nonmagnetic tube, said tube being mounted interiorly of said solenoid and centrally aligned along the longitudinal axis thereof, the length of said tube being small compared to the length of said solenoid, said ferromagnetic core having a very high permeability at zero magnetic field and a low permeability at other values, a search coil wound about said tube, means for supplying a regulated direct current to the winding of said solenoid to produce lines of force within said solenoid of opposite polarity to the lines of force of said unknown magnetic field, means for varying the current supplied to said solenoid whereby a voltage pulse is induced in said search coil when the resultant magnetic field about said core equals zero and means for measuring the magnitude of said supplied current.

4. Apparatus as defined in claim 3 wherein said ferromagnetic core is made of molybdenum-Permalloy.

5. Apparatus for measuring the intensity of an unknown static magnetic field which comprises in combination a first uniformly wound solenoid having its longitudinal axis disposed along the lines of force of said unknow field, the length of said solenoid being large with respect to its diameter, a second uniformly wound solenoid mounted interiorly of said first solenoid and having its longitudinal axis coincident with the longitudinal axis of said first solenoid, the length of said second solenoid being large compared to its diameter, a thin molybdenum-Permalloy core sealed within a quartz tube, said tube being mounted interiorly in said solenoid and centrally aligned along the longitudinal axis thereof, the length of said tube being small compared to the length of said solenoids, a search coil wound about said tube, an oscilloscope, means for applying a sinusoidal current to the winding of said first solenoid and for synchronously applying said current to the horizontal focusing coils of said oscilloscope, means for supplying a regulated direct current to the winding of said second solenoid to establish lines of force within said second solenoid of opposite polarity to the lines of force of said unknown field, an adjustable resistor for varying the current supplied to said second solenoid whereby a voltage pulse is induced in said search coil when the resultant magnetic field about said thin core equals zero, means for amplifying said voltage pulse and means for applying said amplified pulse to the vertical plates of said oscilloscope.

References Cited in the file of this patent

UNITED STATES PATENTS

| Number | Name | Date |
|---|---|---|
| 1,910,957 | Llewellyn | May 23, 1933 |
| 2,252,059 | Barth | Aug. 12, 1941 |
| 2,379,716 | Hull | July 3, 1945 |
| 2,406,360 | Ellwood | Aug. 27, 1946 |
| 2,414,654 | Meredith | Jan. 21, 1947 |
| 2,480,265 | Rubenstein | Aug. 30, 1949 |
| 2,557,761 | Powell | June 19, 1951 |